United States Patent
Goetz

(10) Patent No.: US 12,479,034 B2
(45) Date of Patent: *Nov. 25, 2025

(54) DEVICE FOR TRANSMITTING TORQUE FROM A DRILL TO A DRILL BIT

(71) Applicant: Hilti Aktiengesellschaft, Schaan (LI)

(72) Inventor: Florian Goetz, Frastanz (AT)

(73) Assignee: Hilti Aktiengesellschaft, Schaan (LI)

(*) Notice: Subject to any disclaimer, the term of this patent is extended or adjusted under 35 U.S.C. 154(b) by 748 days.

This patent is subject to a terminal disclaimer.

(21) Appl. No.: 17/784,386

(22) PCT Filed: Dec. 7, 2020

(86) PCT No.: PCT/EP2020/084806
§ 371 (c)(1),
(2) Date: Jun. 10, 2022

(87) PCT Pub. No.: WO2021/115985
PCT Pub. Date: Jun. 17, 2021

(65) Prior Publication Data
US 2023/0047019 A1    Feb. 16, 2023

(30) Foreign Application Priority Data

Dec. 11, 2019 (EP) .................................... 19215082

(51) Int. Cl.
*B23B 31/00* (2006.01)
*B23B 31/107* (2006.01)

(52) U.S. Cl.
CPC .......... *B23B 31/008* (2013.01); *B23B 31/006* (2013.01); *B23B 31/107* (2013.01); *B23B 2231/0264* (2013.01)

(58) Field of Classification Search
CPC ... B23B 31/006; B23B 31/008; B23B 31/107; B23B 2231/0264
See application file for complete search history.

(56) References Cited

U.S. PATENT DOCUMENTS

| 3,790,296 A | 2/1974 | Mottu et al. |
| 5,236,199 A | 8/1993 | Thompson, Jr. |

(Continued)

FOREIGN PATENT DOCUMENTS

| CN | 1332661 A | 1/2002 |
| CN | 1355082 A | 6/2002 |

(Continued)

OTHER PUBLICATIONS

PCT/EP2020/084806, International Search Report dated Feb. 15, 2021 (Two (2) pages).

(Continued)

*Primary Examiner* — Eric A. Gates
(74) *Attorney, Agent, or Firm* — Crowell & Moring LLP

(57) ABSTRACT

A device for transmitting a torque produced by a drill to a drill bit includes a shank and a tool fitting. The shank has a first outer conical region, a groove region, and a second outer conical region and has longitudinal grooves. The tool fitting has a basic body which has a rotary driving region with outer rotary driving grooves, an intermediate element which has an inner driver region with inner rotary drivers and an outer driver region with outer rotary drivers, and a locking device. In the connected state, the inner rotary drivers engage in the longitudinal grooves and the outer rotary drivers engage in the outer rotary driving grooves. Lower rotary drivers are arranged on the base surface of the intermediate element where the lower rotary drivers, in the connected state, interact with lower rotary driving grooves in the rotary driving region of the basic body.

11 Claims, 5 Drawing Sheets

(56) References Cited

U.S. PATENT DOCUMENTS

| | | |
|---|---|---|
| 5,346,340 A | 9/1994 | Runge |
| 5,474,139 A | 12/1995 | Odendahl et al. |
| 5,954,347 A | 9/1999 | Buck et al. |
| 5,971,681 A | 10/1999 | Wolfe et al. |
| 6,261,035 B1 | 7/2001 | Moores, Jr. et al. |
| 6,612,588 B2 | 9/2003 | Ostermeier et al. |
| 7,073,797 B2 | 7/2006 | Gaul |
| 7,175,184 B1 * | 2/2007 | Rinner ............... B23B 31/202 279/43 |
| 7,387,479 B1 | 6/2008 | Lee |
| 8,702,107 B2 | 4/2014 | Cachod |
| 9,221,105 B2 | 12/2015 | Gong et al. |
| 12,053,829 B2 * | 8/2024 | Goetz ............... B23B 45/003 |
| 12,053,830 B2 * | 8/2024 | Goetz ............... B23B 45/003 |
| 2003/0024131 A1 * | 2/2003 | Erickson ........... B23B 31/1071 33/645 |
| 2008/0100006 A1 * | 5/2008 | Chu ................... B23Q 3/12 279/79 |
| 2011/0103902 A1 * | 5/2011 | Erickson ........... B23Q 11/1023 407/66 |
| 2013/0127123 A1 * | 5/2013 | Miyanaga ........ B23B 31/008 408/226 |
| 2023/0051973 A1 * | 2/2023 | Goetz ............... B23B 31/008 |

FOREIGN PATENT DOCUMENTS

| | | | |
|---|---|---|---|
| CN | 1907610 A | 2/2007 | |
| CN | 102292180 A | 12/2011 | |
| CN | 102665980 A | 9/2012 | |
| DE | 4003485 A1 * | 9/1990 | |
| EP | 1 211 005 B1 | 6/2002 | |
| EP | 2 537 611 A1 | 12/2012 | |
| JP | 59-219112 A | 12/1984 | |
| JP | 6-182608 A | 7/1994 | |
| JP | 9-11008 A | 1/1997 | |
| JP | 2002086303 A * | 3/2002 | ......... B23B 31/1071 |
| JP | 2002-213474 A | 7/2002 | |
| KR | 10-2004-0047727 A | 6/2004 | |
| KR | 20190055291 A * | 5/2019 | |

OTHER PUBLICATIONS

U.S. Patent Application, "Device for Transmitting Torque from a Drill to a Drill Bit", filed Jun. 10, 2022, Inventor Florian Goetz.

* cited by examiner

DEVICE FOR TRANSMITTING TORQUE FROM A DRILL TO A DRILL BIT

BACKGROUND AND SUMMARY OF THE INVENTION

The present invention relates to a device for transmitting a torque from a drill to a drill bit.

EP 1 211 005 B1 discloses a known device for transmitting torque from a drill to a drill bit. The device for transmitting torque is arranged between the drill and the drill bit and transmits the torque, which is produced by a drill motor of the drill, to the drill bit. The device for transmitting torque comprises a tool fitting which is permanently connected to the drill or is connected to the drill via a releasable connection, and a shank which is permanently connected to the drill bit or is connected to the drill bit via a releasable connection.

The shank is constructed in a sleeve-shaped manner from a first outer conical region, a groove region, a second outer conical region and a cylinder region and comprises first longitudinal grooves extending over the first outer conical region, the groove region, the second outer conical region and the cylinder region, and second longitudinal grooves extending over the second outer conical region and the cylinder region.

The tool fitting is constructed in three parts from a basic body, an intermediate element and a locking device. The locking device is adjustable parallel to a longitudinal axis of the tool fitting between a receiving position and a locking position, wherein the shank is insertable into the tool fitting in the receiving position and is connected to the tool fitting in the locking position. The intermediate element is annular designed with an inner driver region, which has first inner rotary drivers with a first width and first depth and second inner rotary drivers with a second width and second depth, and with an outer driver region, which has first outer rotary drivers with a third width and third depth. The basic body is sleeve-shaped with an inner conical region and a rotary driving region, which has first outer rotary driving grooves.

In the connected state of the tool fitting and the shank, the first inner rotary drivers of the intermediate element engage in the first longitudinal grooves of the shank, the second inner rotary drivers of the intermediate element engage in the second longitudinal grooves of the shank, and the first outer rotary drivers of the intermediate element engage in the first outer rotary driving grooves. The torque, which is produced by a drill motor of the drill, is transmitted to the shank by means of the first and second inner rotary drivers.

The device for transmitting torque that is known from EP 1 211 005 B1 has the disadvantage that the tool fitting and the shank are approved only for drills having outputs of up to approx. 2.5 kW. At higher outputs, the surface pressure is very high, which can damage the inner and outer rotary drivers of the tool fitting. In addition, the service life of the tool fitting and of the shank is reduced.

The object of the present invention is to further develop the tool fitting and the shank of the device for transmitting torque that is known from EP 1 211 005 B1 such that the new device can transmit higher torques than the old device, the new shank can be connected to the old tool fitting and the new tool fitting cannot be connected to the old shank.

According to the invention, it is provided that lower rotary drivers are arranged on the base surface of the intermediate element and lower rotary driving grooves are arranged in the annular shoulder, wherein, in the connected state of the basic body and the intermediate element, the lower rotary drivers interact with the lower rotary driving grooves. The lower rotary drivers, which interact with the rotary driving grooves of the annular shoulder, increase the contact area between the basic body and the intermediate element without increasing the height of the rotary driving region and, if the surface pressure remains the same, thus enable the transmission of greater forces and torques. The larger the contact area, the lower the surface pressure between the basic body and the intermediate element, or if the surface pressure remains the same, greater forces and torques can be transmitted over the larger contact area.

Preferably, the lower rotary drivers are aligned with the inner rotary drivers in a plane perpendicular to the longitudinal axis of the tool fitting. Owing to the fact that the lower rotary drivers are aligned with the inner rotary drivers, the force and torque are transmitted over the shortest path from the tool fitting to the shank.

Preferably, the lower rotary drivers are aligned with the outer rotary drivers in a plane perpendicular to the longitudinal axis of the tool fitting. Owing to the fact that the lower rotary drivers are aligned with the outer rotary drivers, the force and torque are transmitted over the shortest path from the basic body to the intermediate element.

In a preferred embodiment, the inner rotary drivers of the intermediate element comprise first inner rotary drivers with a first width and first depth and second inner rotary drivers with a second width and second depth, and the longitudinal grooves of the shank comprise first longitudinal grooves and second longitudinal grooves, wherein, in the connected state of the device, the first inner rotary drivers engage in the first longitudinal grooves and the second inner rotary drivers engage in the second longitudinal grooves.

Preferably, the first depth of the first inner rotary drivers and the second depth of the second inner rotary drivers are identical, and the second longitudinal grooves of the shank additionally extend over the first outer conical region and the groove region. Owing to the fact that, in the case of the new tool fitting, the second depth of the second inner rotary drivers is identical to the first depth of the first inner rotary drivers, the second inner rotary drivers in the case of the new tool fitting have a greater second depth than in the case of the old tool fitting. The greater second depth of the second inner rotary drivers increases the contact area between the new tool fitting and the new shank and enables higher torques to be transmitted from the drill to the drill bit.

The greater second depth of the second inner rotary drivers prevents the new tool fitting, which is designed for powerful drills, from being able to be connected to the old shank, which is approved only for drills with outputs of up to approx. 2.5 kW, and thus increases the operational safety of the drill. Since the second longitudinal grooves of the old shank extend only over the second outer conical region and have a smaller depth than in the case of the new shank, the second inner rotary drivers of the new tool fitting are too deep and cannot be inserted into the second longitudinal grooves of the old shank.

Since the second longitudinal grooves in the case of the new shank have a greater depth than in the case of the old shank, the new shank can be connected to the old tool fitting. The second inner rotary drivers of the old intermediate element engage in the second longitudinal grooves of the new shank. The new shank is designed for powerful drills and approved for greater forces and torques than the old tool fitting, which is not critical in operation. Operating a shank with outputs or torques that are lower than the permitted maximum value can have a positive effect on the service life of the shank.

Particularly preferably, the first width of the first inner rotary drivers and the second width of the second inner rotary drivers are identical. The same depth and the same width of the first and second inner rotary drivers has the advantage that there is no need to assign the first inner rotary drivers to the first longitudinal grooves or the second inner rotary drivers to the second longitudinal grooves. Each inner rotary driver can be inserted into any longitudinal groove.

In a preferred embodiment, the outer rotary drivers of the intermediate element comprise first outer rotary drivers with a third width and third depth and second outer rotary drivers with a fourth width and fourth depth, and the outer rotary driving grooves in the annular collar of the basic body comprise first outer rotary driving grooves and second outer rotary driving grooves, wherein, in the connected state of the basic body and the intermediate element, the first outer rotary drivers engage in the first outer rotary driving grooves and the second outer rotary drivers engage in the second outer rotary driving grooves. The second outer rotary drivers increase the contact area between the basic body and the intermediate element and thereby enable the transmission of greater forces and torques. The larger the contact area, the lower the surface pressure between the basic body and the intermediate element, or if the surface pressure remains the same, greater forces and torques can be transmitted over the larger contact area.

In a preferred embodiment, the lower rotary drivers comprise first lower rotary drivers with a fifth width and fifth depth and second lower rotary drivers with a sixth width and sixth depth, and the lower rotary driving grooves comprise first lower rotary driving grooves and second lower rotary driving grooves, wherein, in the connected state of the basic body and the intermediate element, the first lower rotary drivers engage in the first lower rotary driving grooves and the second lower rotary drivers engage in the second lower rotary driving grooves. The formation of the first and second lower rotary drivers and the arrangement thereof on the base surface of the intermediate element has the advantage that the contact area between the basic body and the intermediate element is increased without increasing the height of the rotary driving region, and, in addition, the load on the intermediate element is shifted into other regions.

Preferably, the first lower rotary drivers are aligned with the first inner rotary drivers and the second lower rotary drivers with the second inner rotary drivers, in a plane perpendicular to the longitudinal axis of the tool fitting. Owing to the fact that the first and second lower rotary drivers are aligned with the first and second inner rotary drivers, the force and torque are transmitted over the shortest path from the tool fitting to the shank.

Particularly preferably, the fifth depth of the first lower rotary drivers and the sixth depth of the second lower rotary drivers are identical. The same depth of the first and second lower rotary drivers has the advantage that the force or the torque is transmitted uniformly via the first and second lower rotary drivers from the basic body to the intermediate element.

Particularly preferably, the fifth width of the first lower rotary drivers and the sixth width of the second lower rotary drivers are identical. The same depth and the same width of the first and second lower rotary drivers has the advantage that the force or the torque can be transmitted uniformly via the first and second lower rotary drivers from the basic body to the intermediate element. In addition, there is no need to assign the first lower rotary drivers to the first lower rotary driving grooves or the second lower rotary drivers to the second lower rotary driving grooves.

Exemplary embodiments of the invention are described hereinafter with reference to the drawings. It is not necessarily intended for this to illustrate the exemplary embodiments to scale; rather, the drawings are produced in a schematic and/or slightly distorted form where this is useful for explanation purposes. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and should be able to be used and claimed as desired. For the sake of simplicity, identical reference signs are used hereinafter for identical or similar parts or parts having identical or similar functions.

DETAILED DESCRIPTION OF THE DRAWINGS

Figure 1:
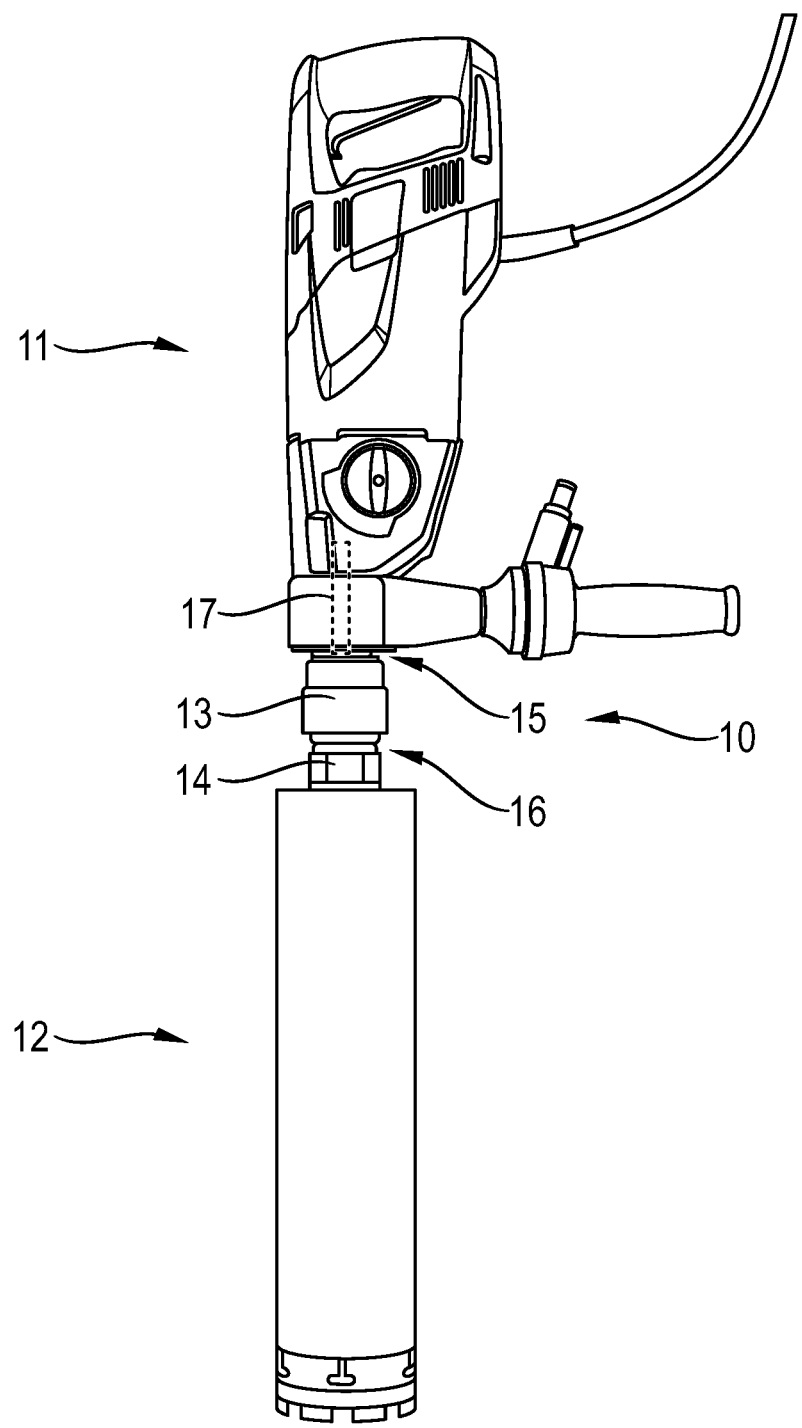
FIG. 1 shows a device according to the invention for transmitting torque from a drill to a drill bit, consisting of a tool fitting, which is connected to the drill, and a shank, which is connected to the drill bit.

FIG. 1 shows a device 10 according to the invention for transmitting a torque from a drill 11 to a drill bit 12. The device 10 is arranged between the drill 11 and the drill bit 12 and transmits the torque from the drill 11 to the drill bit 12.

The device 10 is constructed from a tool fitting 13, which is connected to the drill 11, and a shank 14, which is connected to the drill bit 12. The device 10 is connected to the drill 11 via a first connection 15 and to the drill bit 12 via a second connection 16. In the connected state of the device 10, torque is transmitted via the following components: drive shaft 17 of the drill 11, tool fitting 13, shank 14 and drill bit 12. The connected state of the device 10 is defined as the state in which the tool fitting 13 and the shank 14 are connected.

Figure 2A:
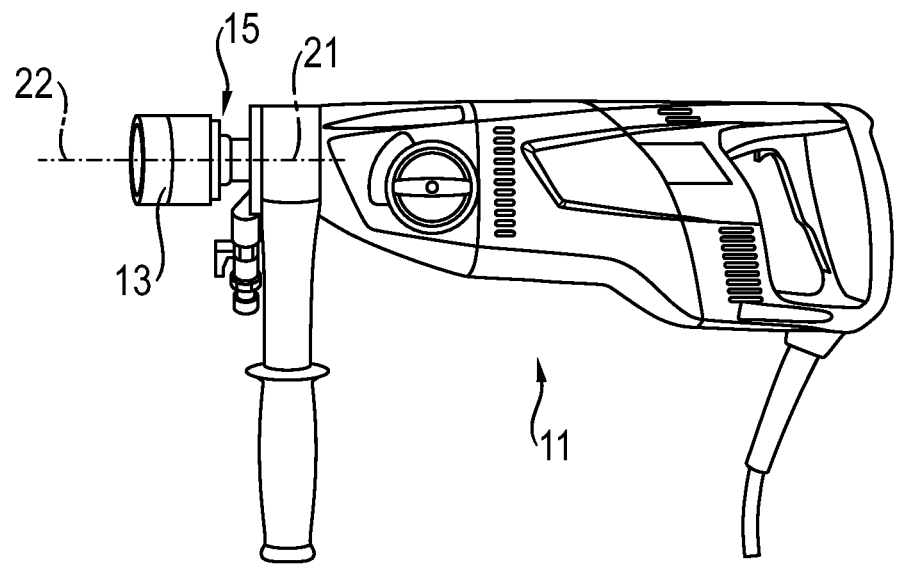
FIGS. 2A, 2B show the tool fitting (FIG. 2A) and the shank (FIG. 2B) of the device according to the invention for transmitting torque that is illustrated in FIG. 1.
Figure 2B:
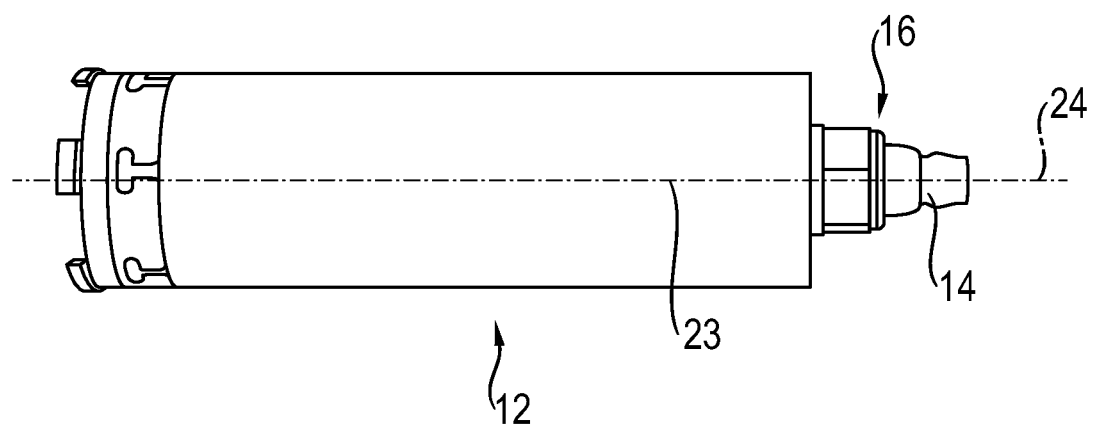

FIGS. 2A, 2B show the drill 11 with the tool fitting 13 (FIG. 2A) and the drill bit 12 with the shank 14 (FIG. 2B) of the device 10 according to the invention. The tool fitting 13 and the shank 14, in the connected state, form the device 10 according to the invention of FIG. 1.

The tool fitting 13 is connected to the drill 11 via the first connection 15, which in the exemplary embodiment is designed as a releasable connection; alternatively, the tool fitting 13 can be connected to the drill 11 via a non-releasable first connection 15. Since the tool fitting 13 is a wearing part, it makes sense to design the tool fitting 13 as a separate component and to connect it to the drive shaft 17 of the drill 11 via a releasable first connection. In order to ensure that the drill 11 is operated only with an approved tool fitting 13, it makes sense to design the first connection 15 in such a way that it can be operated only with a special tool.

The shank 14 is connected to the drill bit 12 via the second connection 16, which is designed as a releasable connection in the exemplary embodiment. For this purpose, the drill bit 12 has an internal thread which is connected to an external thread of the shank 14. The releasable second connection 16 is designed, for example, as a metric ISO threaded connection or other releasable connection. Instead of the releasable second connection 16, the shank 14 can be connected non-releasably to the drill bit 12; for this purpose, the shank 14 can be connected non-releasably to the drill bit 12, for example by welding or other methods.

The drive shaft 17 is designed to be rotatable about a first axis of rotation 21 which, in the connected state of the tool fitting 13 and the drill 11, coincides with a longitudinal axis 22 of the tool fitting 13. The drill bit 12 is designed to be rotatable during operation about a second axis of rotation 23 which, in the connected state of the shank 14 and the drill bit 12, coincides with a longitudinal axis 24 of the shank 14. For differentiation purposes, the longitudinal axis 22 of the tool fitting 13 is referred to as the first longitudinal axis 22 and the longitudinal axis 24 of the shank 14 is referred to as the second longitudinal axis 24. In the connected state of the drill 11 and the drill bit 12, the first longitudinal axis 22 and second longitudinal axis 24 are arranged coaxially to one another.

Figure 3A:
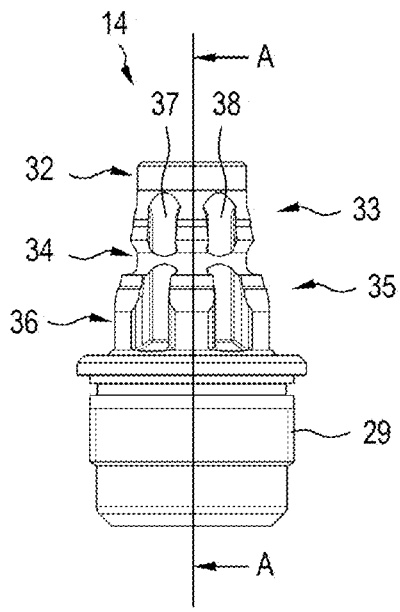
FIGS. 3A, 3B show the shank of the device according to the invention for transmitting torque in a side view (FIG. 3A) and in a longitudinal section along the section plane A-A in FIG. 3A (FIG. 3B)
Figure 3B:
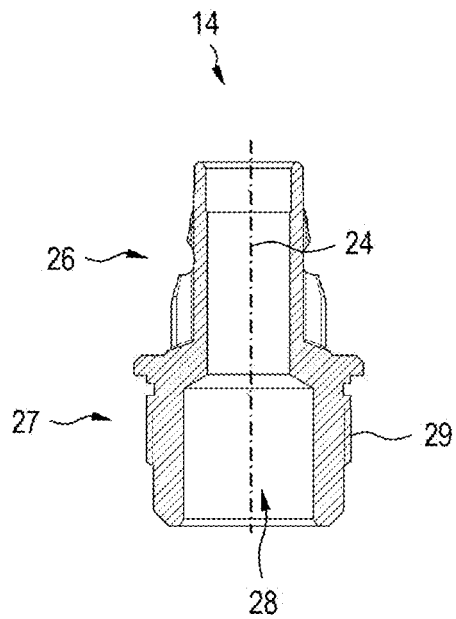

FIGS. 3A, 3B show the shank 14 of the device 10 according to the invention for transmitting torque in the non-connected state of the device 10 in a side view (FIG. 3A) and in a longitudinal section along the section plane A-A in FIG. 3A (FIG. 3B). The shank 14 is constructed from a first portion 26 and a second portion 27, which in the exemplary embodiment are formed in one piece and have a central through-hole 28.

The second portion 27 of the shank 14 has an external thread 29, forming the second threaded connection 16 with a matching internal thread of the drill bit 12. The first portion 26 of the shank 14 is composed of five portions and includes a front region 32, a first outer conical region 33, a groove region 34, a second outer conical region 35 and a cylinder region 36. The first and second outer conical region 33, 35 have a first or second conical outer surface which widens in the direction of the drill bit 12. The conical outer surfaces are produced for example by turning; by manufacturing the first and second conical outer surface in one setting, high manufacturing accuracy can be achieved.

The shank 14 has first longitudinal grooves 37 and second longitudinal grooves 38, which extend parallel to the second longitudinal axis 24 of the shank 14 and are arranged on the outside of the first portion 26. The first and second longitudinal grooves 37, 38 are identically formed and extend over the first outer conical region 33, the groove region 34 and the second outer conical region 35 and also over the cylinder region 36. The first and second longitudinal grooves 37, 38 are uniformly distributed in the circumferential direction 39 of the shank 14 and are arranged alternately, each first longitudinal groove 37 being arranged between two second longitudinal grooves 38. In the exemplary embodiment, the shank 14 has three first longitudinal grooves 37 and three second longitudinal grooves 38.

Figure 4A:
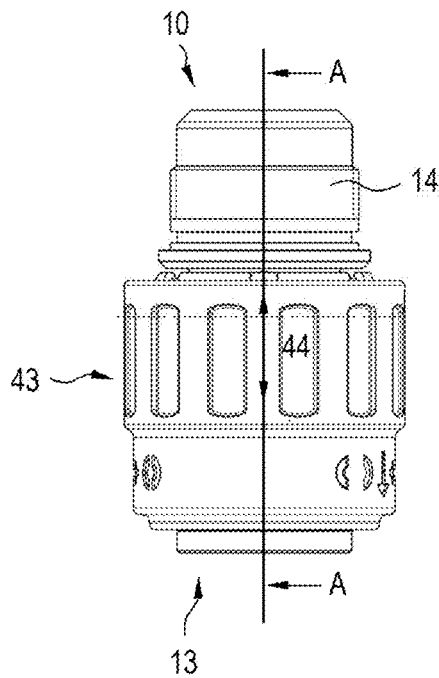
FIGS. 4A, 4B show the device according to the invention for transmitting torque of FIG. 1 in the connected state in which the shank of FIG. 2B is connected to the tool fitting of FIG. 2A, in a side view (FIG. 4A) and in a longitudinal section along the section plane A-A in FIG. 4A (FIG. 4B)
Figure 4B:
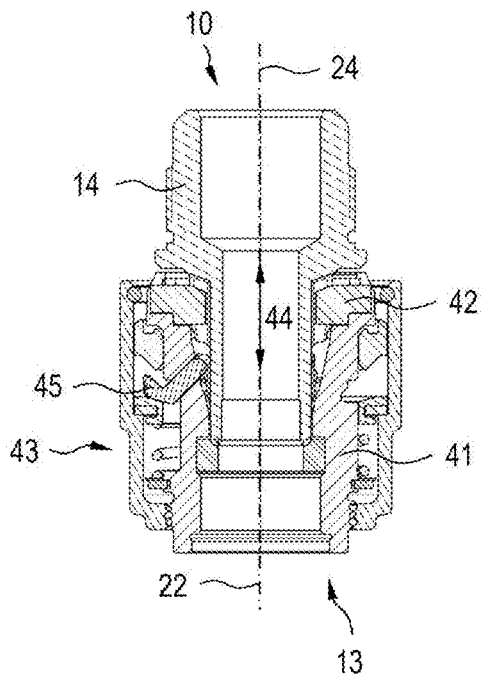

FIGS. 4A, 4B show the device 10 according to the invention for transmitting torque in the connected state, in which the shank 14 is connected to the tool fitting 13, in a side view (FIG. 4A) and in a longitudinal section along the section plane A-A in FIG. 4A (FIG. 4B).

The tool fitting 13 is constructed from a basic body 41, an intermediate element 42 and a locking device 43. The intermediate element 42 forms the interface between the tool fitting 13 and the shank 14 and the torque is transmitted from the intermediate element 42 to the shank 14. The connected state of the tool fitting 13 is defined as the state in which the basic body 41, the intermediate element 42 and the locking device 43 are connected.

The locking device 43 is designed to be adjustable relative to the basic body 41, wherein the locking device 43 is displaceable in a longitudinal direction 44 that runs parallel to the first longitudinal axis 22 of the tool fitting 13, and is rotatable about the first longitudinal axis 22. The locking device 43 is adjustable between a plurality of positions, which are referred to as the basic position, receiving position and locking position. In order to be able to connect the shank 14 to the tool fitting 13 in a form-fitting manner, the locking device 43 is shifted from the basic position in the longitudinal direction 44 into the receiving position. In the receiving position, the shank 14 is inserted into the tool fitting 13. To lock the device 10, the locking device 43 is rotated about the first longitudinal axis 22 into the locking position. In the process, locking elements 45 engage in the groove region 34 of the shank 14 and lock the shank 14 to the tool fitting 13. The basic position of the locking device 43 is optional and can be omitted; the receiving position and locking position of the locking device 43 are necessary.

Figure 5A:
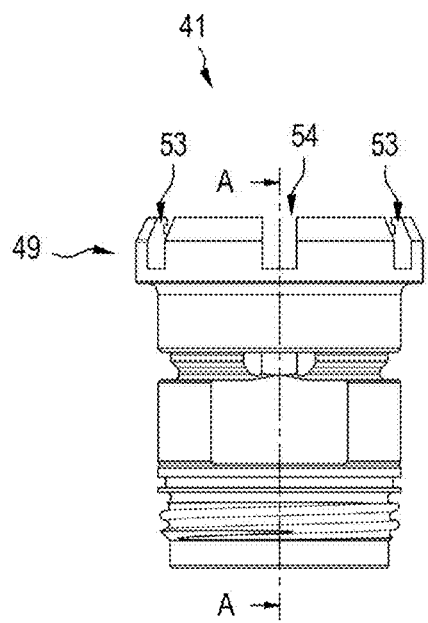
FIGS. 5A-C show a basic body of the tool fitting in a side view (FIG. 5A), in a longitudinal section along the section plane A-A in FIG. 5A (FIG. 5B) and in a plan view of the interface with an intermediate element of the tool fitting (FIG. 5C)
Figure 5B:
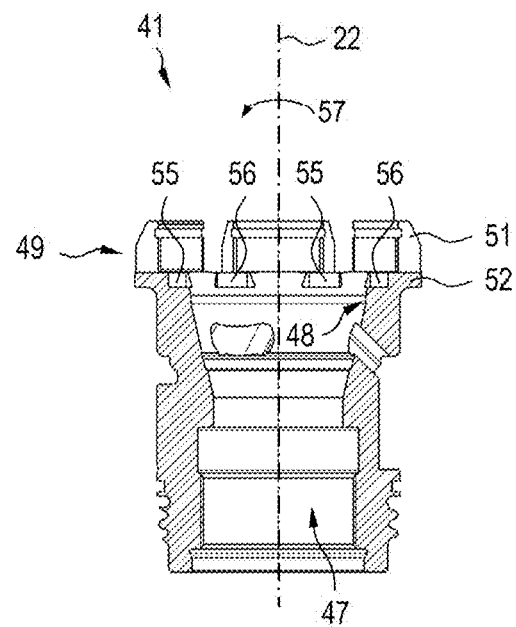
Figure 5C:
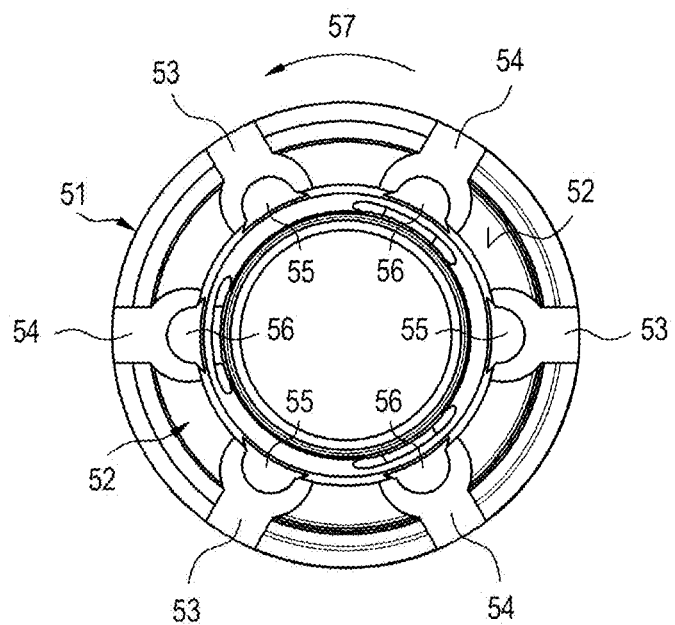

FIGS. 5A-C show the basic body 41 of the tool fitting 13 in a side view (FIG. 5A), in a longitudinal section along the section plane A-A in FIG. 5A (FIG. 5B) and in a plan view of the interface with the intermediate element 42 (FIG. 5C).

The basic body 41 is sleeve-shaped with a central through-hole 47 and is composed of a plurality of portions, which in the exemplary embodiment are made in one piece. In addition to the internal thread, the basic body 41 comprises an inner conical region 48 which interacts with the shank 14, and a rotary driving region 49, which interacts with the intermediate element 42. The inner conical region 48 has a conical inner surface which widens in the direction of the drill. In the connected state of the device 10, the inner conical region 48 of the basic body 41 and the first and second outer conical region 33, 35 of the shank 14 form a form-fitting connection.

The rotary driving region 49 is formed in a step-shaped manner from an annular collar 51 and an annular shoulder 52. First outer rotary driving grooves 53 and second outer rotary driving grooves 54 are provided in the annular collar 51, said grooves interacting with first and second outer rotary drivers of the intermediate element 42 in the connected state of the tool fitting 13, and first lower rotary driving grooves 55 and second lower rotary driving grooves 56 are provided in the annular shoulder 51, said grooves interacting with first and second lower rotary drivers of the intermediate element 42 in the connected state of the device 10. The first and second outer rotary driving grooves 53, 54 are combined under the term "outer rotary driving grooves"

and the first and second lower rotary driving grooves 55, 56 are combined under the term "lower rotary driving grooves".

The first and second outer rotary driving grooves 54, 55 are uniformly distributed in a circumferential direction 57 of the basic body 41 in the annular collar 51 of the rotary driving region 49 and are arranged alternately, each first outer rotary driving groove 55 being arranged between two second outer rotary driving grooves 56. The first and second lower rotary driving grooves 56, 57 are uniformly distributed in the circumferential direction 57 of the basic body 41 in the annular shoulder 52 and are arranged alternately, each first lower rotary driving groove 55 being arranged between two second lower rotary driving grooves 56.

In the exemplary embodiment, the annular collar 51 has three first outer rotary driving grooves 53 and three second outer rotary driving grooves 54, and the annular shoulder 52 has three first lower rotary driving grooves 55 and three second lower rotary driving grooves 56.

Figure 6A:
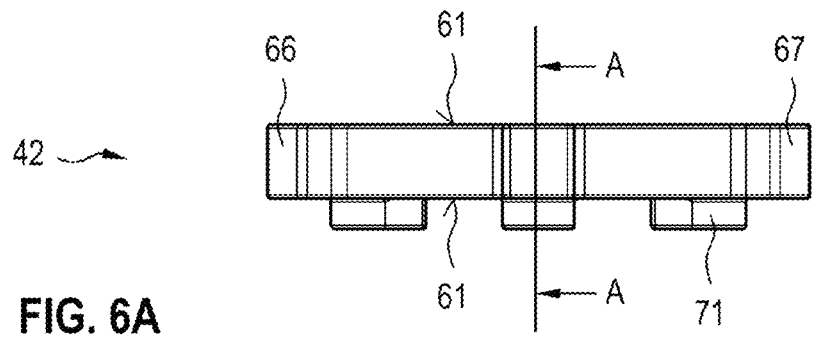
FIGS. 6A-C show an intermediate element of the tool fitting in a side view (FIG. 6A), in a longitudinal section along the section plane A-A in FIG. 6A (FIG. 6B) and in a plan view of the interface with the basic body (FIG. 6C).
Figure 6B:
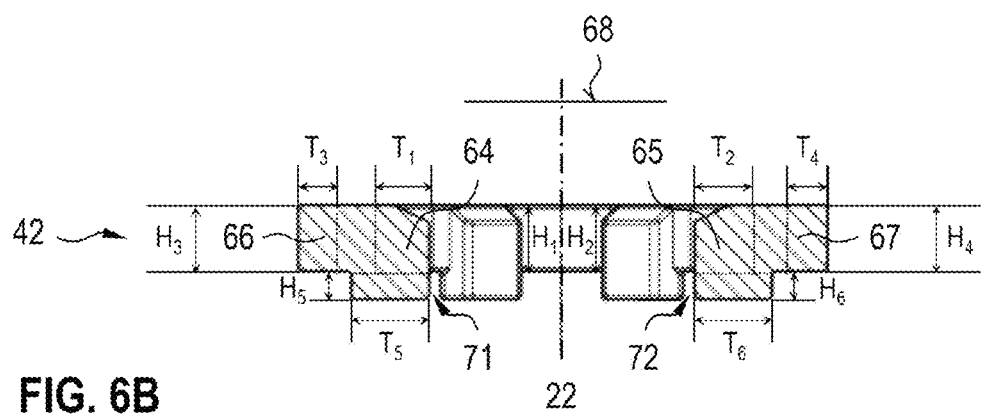
Figure 6C:
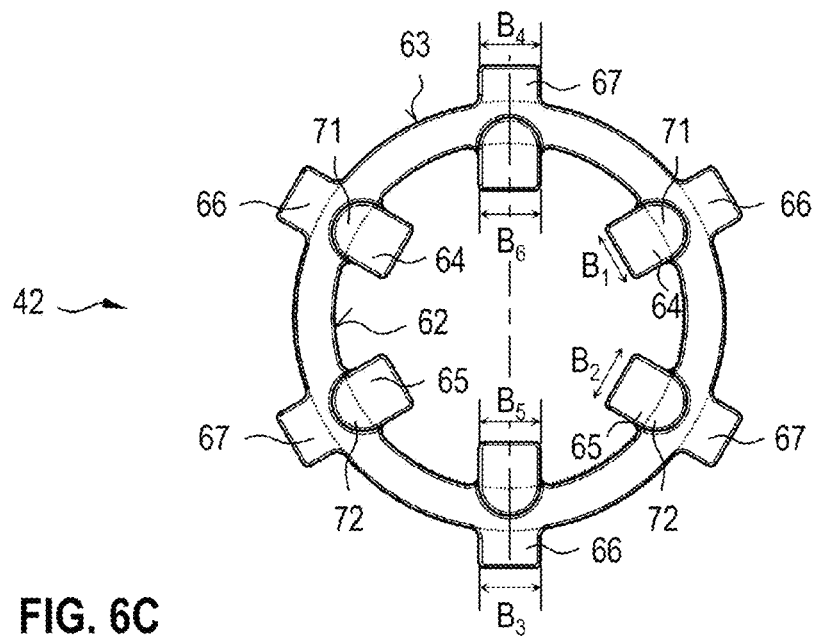

FIGS. 6A-C show the intermediate element 42 of the tool fitting 13 in a side view (FIG. 6A), in a longitudinal section along the section plane A-A in FIG. 6A (FIG. 6B) and in a plan view of the interface with the basic body 41 (FIG. 6C). In the connected state of the device 10, the intermediate element 42 is arranged between the basic body 41 and the shank 14 and the torque is transmitted from the basic body 41 via the intermediate element 42 to the shank 14.

The intermediate element 42 is annular designed with a base surface 61, an inner lateral surface 62 and an outer lateral surface 63. The inner lateral surface 62 forms an inner driver region and the outer lateral surface 63 forms an outer driver region. On the inner lateral surface 62, the intermediate element 42 has first inner rotary drivers 64 and second inner rotary drivers 65 which, in the connected state of the device 10, engage in the first longitudinal grooves 37 and second longitudinal grooves 38 of the shank 14. On the outer lateral surface 63, the intermediate element 42 has first outer rotary drivers 66 and second outer rotary drivers 67 which, in the connected state of the tool fitting 13, engage in the first outer rotary driving grooves 53 and second outer rotary driving grooves 54 on the annular collar 51 of the basic body 41.

The first inner rotary drivers 64 and second inner rotary drivers 65 are combined under the term "inner rotary drivers". Perpendicular to the first longitudinal axis 22 of the tool fitting 13, the first inner rotary drivers 64 have a first width $B_1$ and a first depth $T_1$ and the second inner rotary drivers 65 have a second width $B_2$ and a second depth $T_2$. Parallel to the first longitudinal axis 22 of the tool fitting 13, the first inner rotary drivers 64 extend over a first height $H_1$ and the second inner rotary drivers 65 extend over a second height $H_2$. In order to set the surface pressure between the intermediate element 42 and the shank 14 to be as small as possible, the first and second height $H_1$, $H_2$ are as large as possible.

The first and second outer rotary drivers 66, 67 are combined under the term "outer rotary drivers". Perpendicular to the first longitudinal axis 22 of the tool fitting 13, the first outer rotary drivers 66 have a third width $B_3$ and a third depth $T_3$ and the second outer rotary drivers 67 have a fourth width $B_4$ and a fourth depth $T_4$. Parallel to the first longitudinal axis 22 of the tool fitting 13, the first outer rotary drivers 66 have a third height $H_3$ and the second outer rotary drivers 67 have a fourth height $H_4$. In order to set the surface pressure between the basic body 41 and the intermediate element 42 to be as small as possible, the third and fourth height $H_3$, $H_4$ are as large as possible.

The first outer rotary drivers 66 and second outer rotary drivers 67 are aligned in a plane 68 perpendicular to the first longitudinal axis 22 of the tool fitting 13 with the first inner rotary drivers 64 and second inner rotary drivers 65, respectively. This arrangement has the advantage that the forces are transmitted directly from the basic body 41 to the shank 14. In the connected state of the device 10, the force flows onto the first and second outer rotary drivers 66, 67 on the outer lateral surface 63 of the intermediate element 42; the forces are transmitted via the intermediate element 42 to the first and second inner rotary drivers 64, 65 on the inner lateral surface 62 of the intermediate element 42, the first inner rotary drivers 64 transmitting the forces to the first longitudinal grooves 37 and the second inner rotary drivers 65 transmitting the forces to the second longitudinal grooves 38.

In addition to the inner rotary drivers 64, 65 and outer rotary drivers 66, 67, the intermediate element 42 has first lower rotary drivers 71 and second lower rotary drivers 72, which are arranged on the base surface 61 of the intermediate element 42 and which merge into the first and second inner rotary drivers 64, 65, respectively. The first lower rotary drivers 71 merge into the first inner rotary drivers 64 and the second lower rotary drivers 72 merge into the second inner rotary drivers 65.

The first and second lower rotary drivers 71, 72 are combined under the term "lower rotary drivers". Perpendicular to the first longitudinal axis 22 of the tool fitting 13, the first lower rotary drivers 71 have a fifth width $B_5$ and a fifth depth $T_5$ and the second lower rotary drivers 72 have a sixth width $B_6$ and a sixth depth $T_6$. Parallel to the first longitudinal axis 22 of the tool fitting 13, the first lower rotary drivers 71 have a fifth height $H_5$ and the second lower rotary drivers 72 have a sixth height $H_6$. In order to set the surface pressure between the basic body 41 and the intermediate element 42 to be as small as possible, the fifth and sixth height $H_5$, $H_6$ are as large as possible.

The intermediate element 42 illustrated in the exemplary embodiment has all the rotary drivers which are designed as first and second inner rotary drivers 64, 65, as first and second outer rotary drivers 66, 67 and as first and second lower rotary drivers 71, 72. The second outer rotary drivers 67 are optional. The contact area between the basic body 41 and the intermediate element 42 is increased by the second outer rotary drivers 67.

The new tool fitting 13 differs from the old tool fitting in that it has the lower rotary drivers 71, 72 and lower rotary driving grooves 55, 56. The formation of the first and second lower rotary drivers 71, 72 and the arrangement thereof on the base surface 61 of the intermediate element 42 has the advantage that the contact area between the basic body 41 and the intermediate element 42 is increased without increasing the height of the rotary driving region 49. In addition, the load on the intermediate element 42 is shifted into other regions. The force flow that arises during the transmission of force from the first and second outer rotary drivers 66, 67 to the first and second inner rotary drivers 64, 65 runs predominantly in the plane 68 perpendicular to the first longitudinal axis 22 of the tool fitting 13, and the force flow that arises during the transmission of force from the first and second lower rotary drivers 71, 72 to the first and second inner rotary drivers 64, 65, respectively, runs predominantly parallel to the first longitudinal axis 22 of the tool fitting 13. The loads on the intermediate element 42 are better distributed, which leads to a longer service life of the intermediate element 42.

In the exemplary embodiment of the device 10, the fifth depth $T_5$ of the first lower rotary drivers 71 is identical to the sixth depth $T_6$ of the second lower rotary drivers 72. The same depth ($T_5=T_6$) of the first and second lower rotary drivers 71, 72 has the advantage that the force or the torque is transmitted uniformly via the first and second lower rotary drivers 71, 72 from the basic body 41 to the intermediate element 42. In addition, in the exemplary embodiment of the device 10, the fifth width $B_5$ of the first lower rotary drivers 71 is identical to the sixth width $B_6$ of the second lower rotary drivers 72. The same depth ($T_5=T_6$) and the same width ($B_5=B_6$) of the first and second lower rotary drivers 71, 72 has the advantage that the force or torque can be transmitted uniformly via the first and second lower rotary drivers 71, 72 from the basic body 41 to the intermediate element 42 and, in addition, there is no need to assign the first lower rotary drivers 71 to the first lower rotary driving grooves 55 or the second lower rotary drivers 72 to the second lower rotary driving grooves 56.

With the new tool fitting 13 illustrated in the exemplary embodiment, the first depth $T_1$ of the first inner rotary drivers 64 is identical to the second depth $T_2$ of the second inner rotary drivers 65. With the old tool fitting, the second depth of the second inner rotary drivers is smaller than the first depth of the first inner rotary drivers. The greater second depth of the second inner rotary drivers increases the contact area between the new tool fitting and the new shank and enables greater forces and torques to be transmitted from the drill to the drill bit. The same depth ($T_1=T_2$) of the first and second inner rotary drivers 64, 65 also has the advantage that the new tool fitting cannot be combined with the old shank, since the dimensions of the second longitudinal grooves 38 in the plane perpendicular to the second longitudinal axis 24 of the shank 14 are too small to be combined with the second inner rotary drivers 65.

In the exemplary embodiment of the device 10, the first width $B_1$ of the first inner rotary drivers 64 is identical to the second width $B_2$ of the second inner rotary drivers 65. With the old tool fitting, the second width of the second inner rotary drivers is smaller than with the new tool fitting. The same depth ($T_1=T_2$) and the same width ($B_1=B_2$) of the first and second inner rotary drivers 64, 65 has the advantage that there is no need to assign the first inner rotary drivers 64 to the first longitudinal grooves 37 or the second inner rotary drivers 65 to the second longitudinal grooves 38.

The new tool fitting 13 illustrated in the exemplary embodiment differs from the old tool fitting in that it has the second outer rotary drivers 67 and second outer rotary driving grooves 54. In the connected state of the device 10, the second outer rotary drivers 67 engage in the second outer rotary driving grooves 54 of the basic body 41. The second outer rotary drivers 67 and rotary driving grooves 54 increase the contact area between the basic body 41 and the intermediate element 42 and thereby enable the transmission of greater forces and torques. The larger the contact area, the lower the surface pressure between the basic body 41 and the intermediate element 42, or if the surface pressure remains the same, greater forces and torques can be transmitted over the larger contact area.

In the exemplary embodiment of the device 10, the third depth $T_3$ of the first outer rotary drivers 66 is identical to the fourth depth $T_4$ of the second outer rotary drivers 67. The same depth ($T_3=T_4$) of the first and second outer rotary drivers 66, 67 has the advantage that the force or the torque is transmitted uniformly via the first and second outer rotary drivers 66, 67 from the basic body 41 to the intermediate element 42. In addition, in the exemplary embodiment of the device 10, the third width of the first outer rotary drivers 66 and the fourth width of the second outer rotary drivers 67 are identical. The same depth ($T_3=T_4$) and the same width ($B_3=B_4$) of the first and second outer rotary drivers 66, 67 has the advantage that there is no need to assign the first outer rotary drivers 66 to the first outer rotary driving grooves 53 or the second outer rotary drivers 67 to the second outer rotary driving grooves 54. Each outer rotary driver can be inserted into any outer rotary driving groove.

The invention claimed is:

1. A device (10) for transmitting a torque produced by a drill (11) to a drill bit (12), comprising:
   a shank (14) having a first outer conical region (33), a groove region (34), a second outer conical region (35), and longitudinal grooves (37, 38) extending parallel to a longitudinal axis (24) of the shank (14); and
   a tool fitting (13) which has a basic body (41), an intermediate element (42), and a locking device (43);
   wherein the intermediate element (42) is annular designed with an inner lateral surface (62) on which inner rotary drivers (64, 65) are arranged, an outer lateral surface (63) on which outer rotary drivers (66, 67) are arranged, and a base surface (61) connecting the inner lateral surface (62) and outer lateral surface (63);
   wherein the basic body (41) has an inner conical region (48) and a rotary driving region (49) with an annular collar (51) and an annular shoulder (52) and wherein outer rotary driving grooves (53, 54) are arranged in the annular collar (51);
   wherein the locking device (43) is adjustable parallel to a longitudinal axis (22) of the tool fitting (13) between a receiving position and a locking position and wherein the shank (14) is insertable into the tool fitting (13) in the receiving position and is connected to the tool fitting (13) in the locking position;
   wherein, in a connected state of the device (10), the inner rotary drivers (64, 65) of the intermediate element (42) engage in the longitudinal grooves (37, 38) of the shank (14) and the outer rotary drivers (66, 67) of the intermediate element (42) engage in the outer rotary driving grooves (53, 54) of the annular collar (51);
   wherein lower rotary drivers (71, 72) are arranged on the base surface (61) of the intermediate element (42) and lower rotary driving grooves (55, 56) are arranged in the annular shoulder (52) and wherein, in a connected state of the basic body (41) and the intermediate element (42), the lower rotary drivers (71, 72) interact with the lower rotary driving grooves (55, 56).

2. The device as claimed in claim 1, wherein the lower rotary drivers (71, 72) are aligned with the inner rotary drivers (64, 65) in a plane (68) perpendicular to the longitudinal axis (22) of the tool fitting (13).

3. The device as claimed in claim 1, wherein the lower rotary drivers (71, 72) are aligned with the outer rotary drivers (66, 67) in a plane (68) perpendicular to the longitudinal axis (22) of the tool fitting (13).

4. The device as claimed in claim 1, wherein the inner rotary drivers (64, 65) of the intermediate element (42) comprise first inner rotary drivers (64) with a first width ($B_1$) and first depth ($T_1$) and second inner rotary drivers (65) with a second width ($B_2$) and second depth ($T_2$), wherein the longitudinal grooves (37, 38) of the shank (14) comprise first longitudinal grooves (37) and second longitudinal grooves (38), and wherein, in the connected state of the device (10), the first inner rotary drivers (64) engage in the first longitudinal grooves (37) and the second inner rotary drivers (65) engage in the second longitudinal grooves (38).

5. The device as claimed in claim 4, wherein the first depth ($T_1$) of the first inner rotary drivers (64) and the second depth ($T_2$) of the second inner rotary drivers (65) are identical and wherein the second longitudinal grooves (38) of the shank (14) additionally extend over the first outer conical region (33) and the groove region (34).

6. The device as claimed in claim 5, wherein the first width ($B_1$) of the first inner rotary drivers (64) and the second width ($B_2$) of the second inner rotary drivers (65) are identical.

7. The device as claimed in claim 4, wherein the outer rotary drivers (66, 67) of the intermediate element (42) comprise first outer rotary drivers (66) with a third width ($B_3$) and third depth ($T_3$) and second outer rotary drivers (67) with a fourth width ($B_4$) and fourth depth ($T_4$), wherein the outer rotary driving grooves (53, 54) in the annular collar (51) of the basic body (41) comprise first outer rotary driving grooves (53) and second outer rotary driving grooves (54), and wherein, in the connected state of the basic body (41) and the intermediate element (42), the first outer rotary drivers (66) engage in the first outer rotary driving grooves (53) and the second outer rotary drivers (67) engage in the second outer rotary driving grooves (54).

8. The device as claimed in claim 7, wherein the lower rotary drivers (71, 72) comprise first lower rotary drivers (71) with a fifth width ($B_5$) and fifth depth ($T_5$) and second lower rotary drivers (72) with a sixth width ($B_6$) and sixth depth ($T_6$), and the lower rotary driving grooves (55, 56) comprise first lower rotary driving grooves (55) and second lower rotary driving grooves (56), wherein, in the connected state of the basic body (41) and the intermediate element (42), the first lower rotary drivers (71) engage in the first lower rotary driving grooves (55) and the second lower rotary drivers (72) engage in the second lower rotary driving grooves (56).

9. The device as claimed in claim 8, wherein the first lower rotary drivers (71) are aligned with the first inner rotary drivers (64) and the second lower rotary drivers (72) with the second inner rotary drivers (65) in a plane (68) perpendicular to the longitudinal axis (22) of the tool fitting (13).

10. The device as claimed in claim 8, wherein the fifth depth ($T_5$) of the first lower rotary drivers (71) and the sixth depth ($T_6$) of the second lower rotary drivers (72) are identical.

11. The device as claimed in claim 10, wherein the fifth width ($B_5$) of the first lower rotary drivers (71) and the sixth width ($B_6$) of the second lower rotary drivers (72) are identical.

* * * * *